April 11, 1944. E. PITOU ET AL 2,346,391
STRUCTURAL MEMBER
Filed Jan. 14, 1943 2 Sheets-Sheet 1
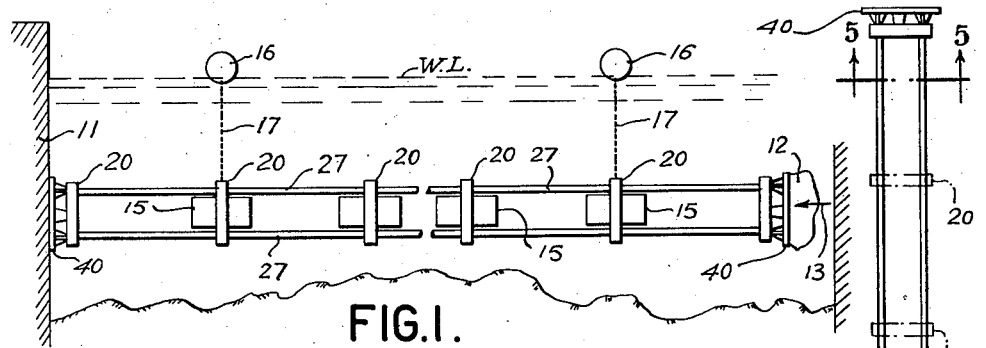
FIG.1.
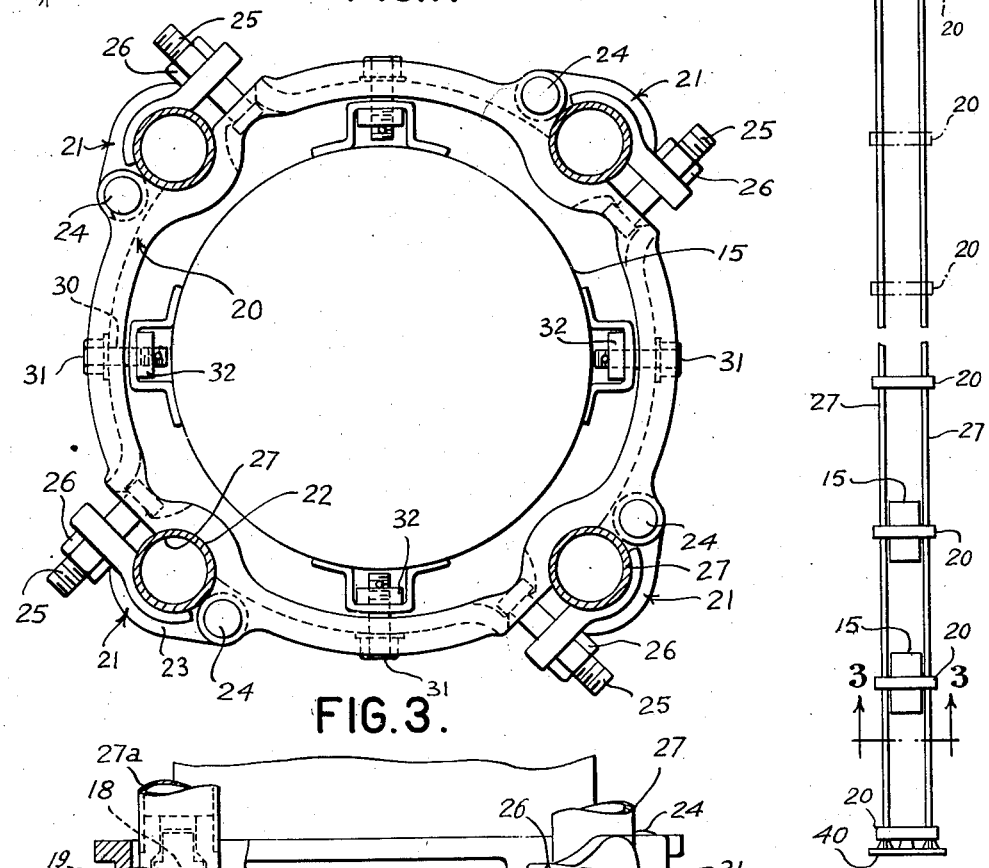
FIG.3.
FIG.2.
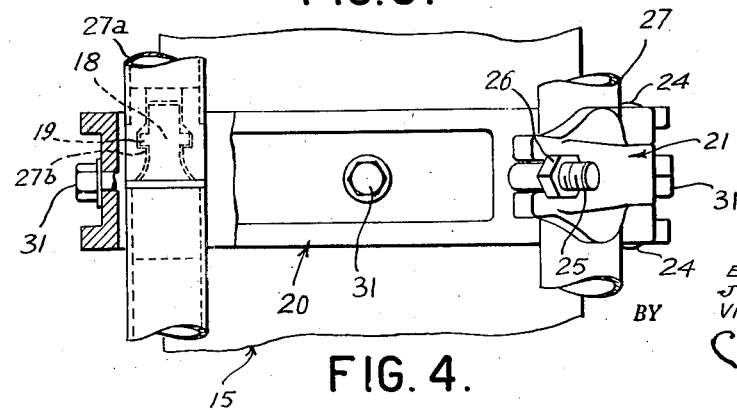
FIG.4.
INVENTORS
EUGENE PITOU
JOSEPH HUCK
VICTOR W. MENG
BY C. P. Goepel
ATTORNEY April 11, 1944.  E. PITOU ET AL  2,346,391
STRUCTURAL MEMBER
Filed Jan. 14, 1943  2 Sheets-Sheet 2

INVENTORS
EUGENE PITOU
JOSEPH HUCK
VICTOR W. MENG
BY
C. P. Joepel
ATTORNEY

Patented Apr. 11, 1944

2,346,391

UNITED STATES PATENT OFFICE 2,346,391

STRUCTURAL MEMBER

Eugene Pitou, New York, N. Y., Joseph Huck, Cresskill, N. J., and Victor W. Meng, Hollis, N. Y., assignors to The Patent Scaffolding Co., Inc., Long Island City, N. Y., a corporation of New York Application January 14, 1943, Serial No. 472,346

1 Claim. (Cl. 114—219)

This invention relates to structural members.

It has for its object to provide structural members which may be of any suitable length, and be also resistant to bending strains, yet may be assembled and disassembled with ease, with the separate parts of such a structure of such weight as to be easily carried by a man.

The invention consists in the provision of assembly rings to hold tubes in positions parallel with each other, the tubes being preferably of various length, so that their abutting joints are staggered along the length of the member instead of being located at one place which might weaken the structure. The ends of the structural members are so arranged as to be readily adapted to the use intended to be made of the structural member. The disposition of the assembly rings and tubes is such as to give strength to the member as a whole. Furthermore, buoyancy tanks are enclosed within the group of tubes when it is desired to use the structural member submerged in water.

The invention will be further described, embodiments shown in the drawings, and the invention will be finally pointed out in the claim.

In the accompanying drawings—

Fig. 1 is a side view showing the use to which a device embodying the invention is being put;

Fig. 2 is a side view of a mechanical member embodying the invention;

Fig. 3 is a sectional view of an assembly ring showing the manner of securing the parts thereto, taken on line 3—3 of Fig. 2;

Fig. 4 is a side view thereof;

Similar characters of reference indicate similar parts.

Figure 5:
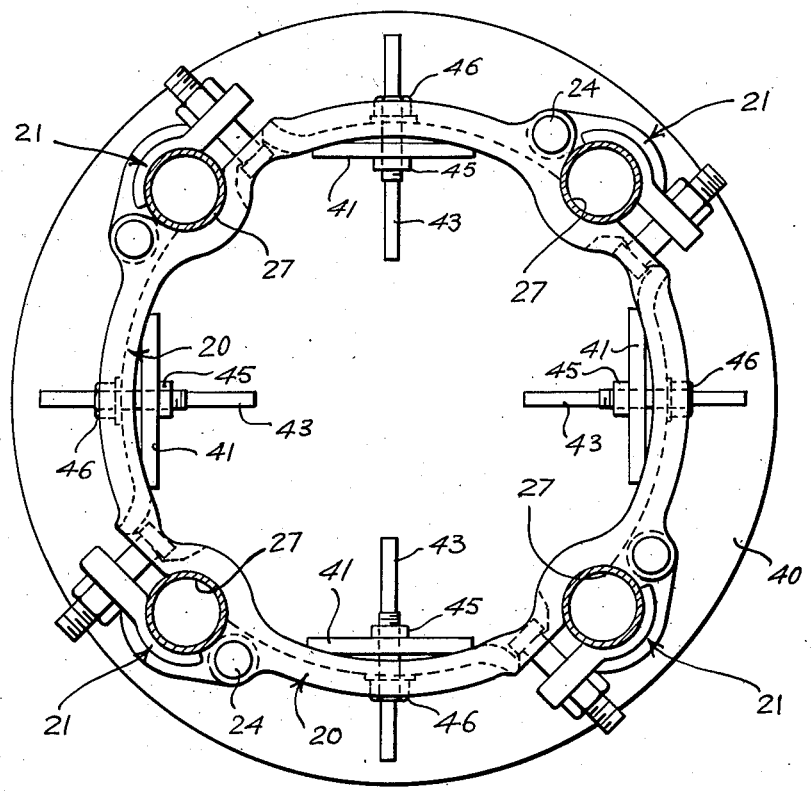
Fig. 5 is a sectional view of the assembly ring at the end of the mechanical member, taken on line 5—5 of Fig. 2.
Figure 6:
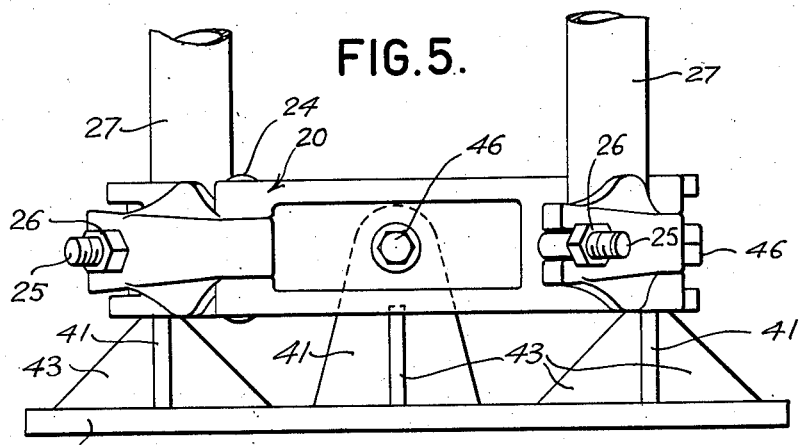
Fig. 6 is a side view of the same.

Referring to the drawings, and more particularly to Fig. 1, one use of my improved structural member is there shown, the member being used as a boom and submerged below water level.

The member 10 is placed at right angles to a dock or ship 11, with a shock deadener 12 preferably disposed at one end thereof. Such deadeners are usually made of rope and are well known. The arrow 13 indicates that some force is being exerted in the direction of the arrow. This may be another ship, or a dock, or any other object tending to exert such force. A buffer or noise deadener like 12 may or may not be used, or may be used at both ends.

The member 10 has tanks 15 containing compressed air or some suitable and known chemical, which in an air-tight container serves to give buoyancy to the tank and to anything connected therewith, and in the use as shown, it is desirable to so regulate the buoyancy that the member is about eight feet below water level.

Floats 16 connected by chains 17 to the member 10 indicate on the surface of the water the general position of the member when submerged, and these floats may be so arranged as to take up part of the suspension load.

The hollow tubes 27 are preferably such as are interlocked at their ends. Such forms are standard equipment, and are hollow tubes of any suitable diameter, with one end providing a male locking member 18 having a shoulder 19. The other end of the tube is open. The latter or female end of an adjacent tube is placed over the male end and a quarter turn brings about a bayonet conection holding one tube in aligned position with the other. The female end 27c has a groove 27b to be engaged by the projection 19. A longitudinal channel permits disengagement of the parts upon the reverse turning of the parts. This structure is known under the tradename Tubelox, but other types of connection may be used for such cases where the clamps on the rings are not by themselves sufficient to hold the ends toegther.

The invention consists in the provision of an assembly ring to hold such tubes in position. Such a ring is shown in Fig. 3, and indicated by 20. It is an annulus, with preferably four tube couplings 21, each of which has a tube seat 22 of semi-circular shape to register with half the circumference of the tube to be placed therein, and each of which has a pivoted jaw 23, hinged at 24 and held over the remaining half of the tube by a bolt 25, the tightening of the nut 26 clamping the tube 27 to the ring 20. The tubes 27 are at right angles to the plane of the annulus ring 20. The clamping devices described are preferably like those of U. S. Letters Patent No. 1,918,843, though other forms may be used. The seat 22 is part of the ring 20, but if desired the clamping device as an entirety can be connected or pivoted to the ring, which would permit an angularity of the tubes to the ring for some cases, where this may be desired.

The ring 20 has four radially disposed openings 30, through which bolts 31 pass, and these bolts by a suitable mechanism 32 on a container or tank 15 support the same. Such tanks are adapted to hold compressed air, or some chemical such as is generally used to give buoyancy to floats. These tanks may be disposed at each ring or only at some of them or at the ends of the members. In any case, the aggregate length, that is, contents of the tanks is selected to give the necessary buoyancy to the member at a depth below water level as may be desired.

A structural member may have an entire length of sixty feet, end to end. In such a case preferably, ten and twenty feet tube lengths would be used, and these would be aligned and abutted end to end with each other, so that only one joint appears at one ring. Other lengths can be used to accomplish similar results. The rings are made of malleable iron. The tubes have an outside diameter of 1.9 inches. The diameter of the end plate is 16 inches. The tubes could be 5 ft. long, in which case ten 5 ft. tubes and two 4 ft. 10½ in. tubes, one for each end, would be used. One and one-half inches is allowed for each of the end caps. From center to center of adjacent tubes is ten inches, and from center of tube to center of opening 30 is five inches. The depth of the assembly ring is three inches. The tank diameter is ten inches in diameter and twenty inches long. These dimensions are those preferred without any desire to be limited thereto.

At the ends of the structural member 10, a cap may be placed over the ends of the tubes, and a covering member placed over the male end of the tubes to plug the spaces between the extending ends of the tubes.

In the embodiment, however, for the particular use of a buoyant boom, the ends are provided with means to connect with circular plates 40 as shown in Figs. 3 and 4. These plates 40 have four uprights 41, with openings 42, through which bolts 43 pass to connect such plates with the assembly ring.

Each ring is made of suitable metal, weight about twenty pounds, and can be carried by a man. So, each tube length and tank can be carried by a man. Thus, when disassembled the parts may be stored, and when desired for use can be readily carried and assembled, until again desired to be stored. For instance, a derrick beam is used only at the beginning and end of a voyage. It can be assembled when the vessel is being loaded, then disassembled and again assembled when the vessel is to be unloaded. Other uses, like antennae poles, will answer for such cases where a composite structural member is desired, since four tubes held by spaced assembly rings form a much stronger unit than a single tube structure.

Instead of hollow tubes solid rods may be used. Instead of an annulus ring, a plate can be used.

We have described several forms of the invention, but obviously various changes may be made in the details disclosed without departing from the spirit of the invention as set out in the following claim.

What we claim is:

A structural member comprising a plurality of parallel assembly rings of annulus form axially spaced from each other, each of the assembly rings having pivoted clamping jaws disposed circumferentially thereon, openable outwardly, and having bolt connections thereon circumferentially intermediate of said clamping jaws, a plurality of tubular members held by said clamping jaws outwardly of said annulus, the axes of said members being at right angles to the parallel planes of said annuli, a plurality of tanks held by said bolt connections within said annuli, and cap members, each having a flat face on one side and projections on the other side, one cap member for each end of the structural member, the projections being connected with the bolt connections of the end assembly rings, all of said parts being detachably connected with each other, the displacement and contents of said tanks being such as to provide buoyancy sufficient to substantially counterbalance the weight of said structural member when submerged.

EUGENE PITOU.
JOSEPH HUCK.
VICTOR W. MENG.